W. H. SAUVAGE.
FLUID PRESSURE BRAKE SYSTEM.
APPLICATION FILED JULY 29, 1913.

1,139,376.

Patented May 11, 1915.
2 SHEETS—SHEET 1.

Attest:
W. M. Gina
Worthington Campbell

Inventor:
William H. Sauvage
by Redding Greeley & Bartlett
Attys.

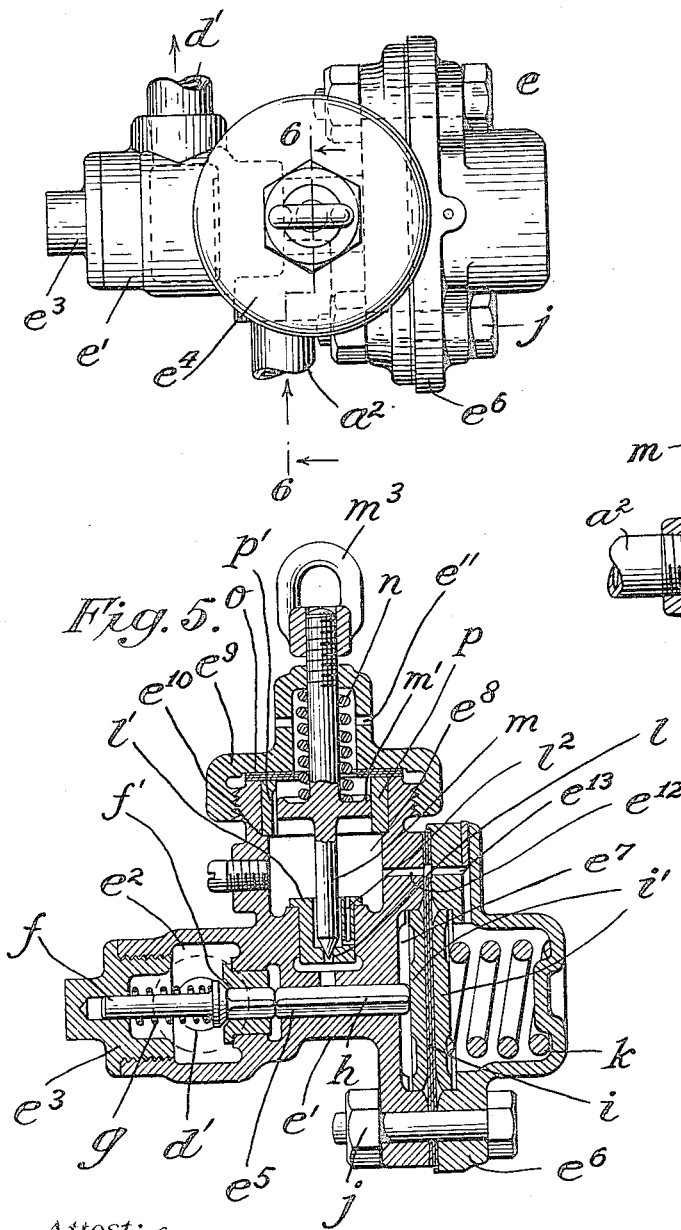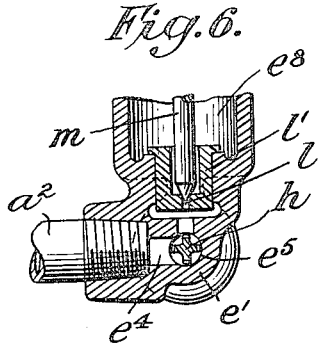

UNITED STATES PATENT OFFICE.

WILLIAM H. SAUVAGE, OF NEW YORK, N. Y.

FLUID-PRESSURE BRAKE SYSTEM.

1,139,376. Specification of Letters Patent. Patented May 11, 1915.

Application filed July 29, 1913. Serial No. 781,765.

*To all whom it may concern:*

Be it known that I, WILLIAM H. SAUVAGE, a citizen of the United States, and residing in the borough of Manhattan of the city of New York, in the State of New York, have invented certain new and useful Improvements in Fluid-Pressure Brake Systems, of which the following is a specification, reference being had to the accompanying drawings, forming a part hereof.

In the operation of railway cars and especially of freight cars in which the load varies through wide ranges with respect to the weight of the car, it is desirable to provide means whereby the available braking power may be varied somewhat in proportion to such variations in the load. It has been proposed in previous constructions to approximate this condition by providing two or more brake cylinders operable successively to supplement the braking force the one of the other as the load on the car increased. Such a solution of the problem was fraught with many difficulties and under some conditions of use has not proven entirely satisfactory.

It is the object of this invention to provide means readily applicable to railway cars and operable to vary the braking force in substantial proportion to the load of the car. In accordance with the invention a primary auxiliary reservoir is provided, which, so long as the pressure therein is maintained at a predetermined point, serves to provide adequate braking pressure or which, when the car is empty, normally provides sufficient air to control the brakes. In communication with this primary auxiliary reservoir is placed a secondary auxiliary reservoir and the connection between the two reservoirs is controlled by means operable automatically to permit the admission of air into the primary reservoir when the pressure in the primary reservoir falls below a predetermined point or when the train is heavily loaded and the maximum braking force is required.

A further object of the invention is to provide a valve to control the admission of air from the secondary reservoir into the primary reservoir which shall be operable automatically to permit this admission of air as changing conditions of use require, shall be simple in construction and shall also be operable through suitable mechanical or manual devices to place the two reservoirs in constant communication.

The invention will be more particularly described with reference to the accompanying drawings in which—

Figure 1:
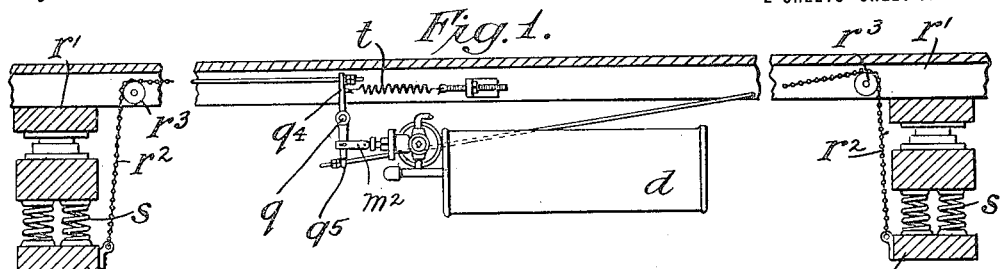
Figure 2:
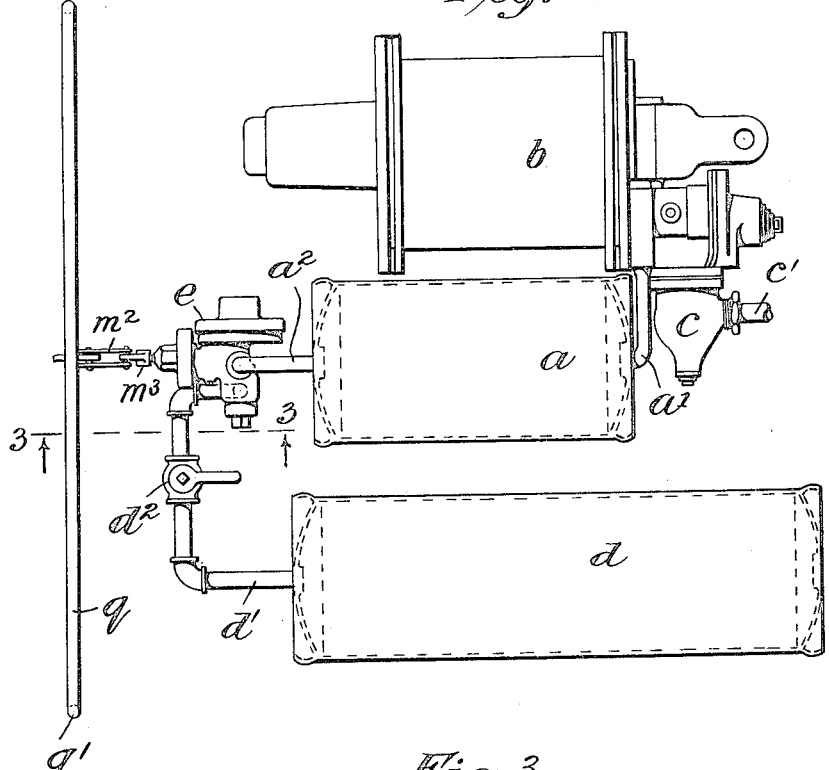
Figure 3:
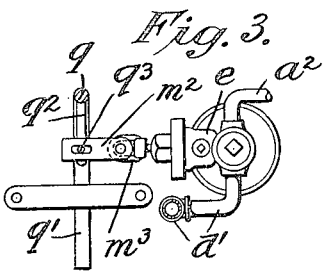

Figure 1 is a fragmentary view, partly in section, of a railway car provided with two air reservoirs in communication through the improved valve, the latter being connected mechanically to the car body so as to place the reservoirs in permanent communication automatically when the car is loaded. Fig. 2 is a view in plan showing the two air reservoirs in communication with each other through the improved valve and showing a brake cylinder with which the primary auxiliary reservoir is in communication. Fig. 3 is a detail view, partly in section, taken on the plane indicated by the line 3—3 of Fig. 2 and looking in the direction of the arrows, and showing particularly the manually operable devices for controlling the valve between the auxiliary reservoirs. Fig. 4 is a detail view in plan on a larger scale of the improved valve. Fig. 5 is a view in vertical section of the valve shown in Fig. 4. Fig. 6 is a sectional detail view taken on the plane indicated by the broken line 6—6 of Fig. 4.

The relationship of the air reservoirs to each other and to the brake cylinder and the construction and function of the improved valve by which braking forces substantially proportionate to the load are secured will be described before pointing out the practical application of the system to a railway car, such as is illustrated in Fig. 1.

Referring now to Fig. 2, it will appear that the improved devices, suitable for application to a single car, include a primary auxiliary reservoir $a$ connected to a brake cylinder $b$ and the train pipe $c'$, as through a suitable duct $a'$, and the triple valve $c$. The primary reservoir $a$ is in communication in turn with a secondary auxiliary reservoir $d$ through a duct $a^2$ leading to the improved valve, indicated generally at $e$, and through a duct $d'$ which leads from the improved valve to the secondary reservoir $d$. The last named duct $d'$ may be provided with a manually operable cut-out cock $d^2$. It will be understood that so long as the air pressure in the primary reservoir $a$ remains sufficiently high the brake $b$ may be operated solely by air from this reservoir in the usual manner. Indeed, when the car is light, the pressure within the primary reservoir $a$ may be sufficient for the braking force even though this pressure be relatively low. However, frequent applications of the brakes will lower the pressure within the primary reservoir $a$ below a predetermined minimum and its air will be so dissipated that subsequent applications of the brake may not be made without a replenishing of the air within the primary reservoir. In accordance with the present invention, it is proposed to replenish this air automatically as may be necessary, by air admitted into the primary reservoir $a$ from the secondary auxiliary reservoir $d$ through the ducts $d'$ and $a^2$. For the reasons hereinbefore pointed out, however, it is desirable for this air to be admitted only from time to time as conditions of use require and peculiar to the particular car to which the system is applied. Accordingly the connecting ducts $a^2$ and $d'$ between the primary reservoir $a$ and the secondary reservoir $d$ have placed therein an improved valve $e$ which shall be operable automatically to control the admission of air from the secondary reservoir into the primary reservoir. Likewise, when the car is heavily loaded, it is desirable to have the pressure in the brake cylinder proportioned to the load and therefore air from both reservoirs $a$ and $d$ is admitted into the brake cylinder by placing the two reservoirs in constant communication, as through the improved valve now to be described.

The valve $e$ comprises a main body portion $e'$ recessed, as at $e^2$, to form a chamber in communication with the secondary auxiliary reservoir duct $d'$. The end wall of this chamber may consist of a plug $e^3$ threaded removably into the wall of the main body portion $e'$ of the valve. The main body portion $e'$ of the valve may be formed with a similar chamber indicated in part in dotted lines in Fig. 4 at $e^4$ which communicates with the primary air reservoir duct $a^2$. These chambers $e^2$ and $e^4$ may be placed in communication through a central passage $e^5$ formed in the main body portion $e'$, but this last named passage is controlled by a check valve $f$ disposed mainly within the chamber $e^2$ and held to its seat $f'$ partly by the spring $g$ operatively disposed with respect to the valve and partly by the air pressure within the chamber $e^2$, the latter, of course, being the same as the air pressure within the secondary reservoir $d$. The valve $f$ rests against or is carried by a suitable star-shaped or corrugated stem $h$ disposed within the central passage $e^5$ and bearing, at its free end, against a diaphragm $i$ secured at right angles thereto by means of a removable cap $e^6$ secured to the main body $e'$ of the valve $e$ by bolts $j$. The main body $e'$ of the valve $e$ is recessed, as at $e^7$, to receive partly the washers $i'$, which are disposed on opposite sides of the diaphragm $i$, the washer on the inner face of the diaphragm abutting against the stem $h$ and the washer on the outer face of the diaphragm constituting a seat for the spiral spring $k$. This spring $k$ abuts against the inner wall of the cap $e^6$ which is preferably recessed at this point to form a chamber within which the spring is disposed. In the interest of sensitiveness and efficiency it is desirable that the valve $f$, stem $h$, diaphragm $i$, washers $i'$ and spring $k$ should all be mounted with their axes substantially coincident. From the description thus far given it will be evident that the spring $g$ and the pressure of the air from the secondary reservoir $d$ tend to seat the valve $f$ and close the communication $e^5$ between the air chamber $e^2$ and the air chamber $e^4$ while permitting at all times the recharging of the secondary reservoir. However, the pressure of the spring $k$ tends to unseat the valve $f$ and place the two reservoirs $a$ and $d$ in communication through the passage $e^5$. The effective pressures of the springs $g$ and $k$ are so adjusted with respect to the air pressures to be employed during the operation of the brakes as to permit the valve $f$ to be seated so long as the pressure of the air within the primary reservoir $a$ is sufficient to apply the brakes. This minimum pressure, of course, depends entirely upon operating conditions and may be fixed with respect to the application of the brakes when the car is light or when the car is loaded. At all events, the function of the improved valve is to place the primary reservoir $a$ in communication instantly with the secondary reservoir $d$ when the pressure within the primary reservoir falls below this predetermined minimum operating point. For instance, suppose the spring $k$ has an effective pressure on the underside of the valve $f$, through the stem $h$, of twenty pounds, taking into account the various opposing and supplementary pressures. If, then, the pressure within the primary reservoir $a$ falls below twenty pounds, the spring $k$ will immediately become effective to unseat the valve $f$ and place the primary reservoir in communication with the secondary reservoir $d$ through the air chamber $e^4$, central passage $e^5$ and air chamber $e^2$. The air within the secondary reservoir $d$ which, it may be assumed, has not been dissipated, will then rush into the primary reservoir $a$ and restore the pressure in the primary reservoir. Even after the brakes are applied, the air from the supplemental reservoir will continue to flow into the primary reservoir $a$ until the effective pressure within the reservoir has risen to a predetermined point sufficient to overcome the tension of the spiral spring $k$ and thus permit the valve $f$ to be seated under the action of the spring $g$ and the secondary reservoir air pressure. Where each car of a train is equipped with the system just described it will be evident that the application of the brakes of each car will be brought about by the proper air pressure determined automatically in the manner pointed out, the breaking force on each car being substantially proportionate to the load thereof.

As indicated hereinbefore, it may become desirable to place the secondary reservoir $d$ in permanent communication with the primary reservoir $a$, as during a run with the car heavily loaded. Provision for accomplishing this is made in the following manner. A third air chamber $e^8$ is formed in the primary body portion $e'$ of the valve $e$ and is in communication with the central air passage $e^5$ through a duct $l$ formed in a bushing $l'$ seated in the main body portion, the duct being controlled by a needle valve $m$, provided with a piston $m'$ on which seats a spiral spring $n$, effective to hold the valve to its seat. This spring $n$ is effective to overcome the pressure of the air on the under face of the piston $m'$ at some predetermined point, say, for instance when the pressure is about twenty pounds. Hence, the valve $m$ is always seated when the air in the communicating reservoirs falls below this predetermined pressure, the result being, as hereinafter set out, to close automatically the communication between the two reservoirs. In the air chamber $e^8$ is a bushing $p$ grooved interiorly part-way from its inner edge, as at $p'$, and formed to receive snugly the piston $m'$ of the valve $m$. It may happen that the valve $m$ at times will not seat snugly so as to close completely the duct $l$ and in that case there is a leakage of air from the central air passage $e^5$ into the chamber $e^8$. To prevent chattering of the valve $m$ or other ill effects from such a leakage, the valve is formed to pass loosely through the bushing $l'$ and an additional by-pass $l^2$ is formed in the wall of the bushing. When this slight leakage reaches the chamber $e^8$ it may escape freely into the atmosphere through the groove $p'$ in the annular bushing $p$ and vents $e^{11}$ formed in the wall of the cap $e^9$.

If, now, the needle valve $m$ be unseated manually or otherwise so as to open wide the duct $l$ and draw the piston $m'$ to the upper edge of the annular bushing $p$, the air chamber $e^8$ will receive air at the same pressure as has the air within the central passage $e^5$. When the piston $m'$ is moved by the increased pressure to the upper edge of the annular bushing $p$, it will be observed that the groove $p'$ is cut off by the piston $m'$ and no longer serves as a communication between the air chamber $e^8$ and the vents $e^{11}$ in the cap $e^9$ and the escape of air to the atmosphere is prevented. Provision is also made for the transmission of pressure from the air chamber $e^8$ through registering ducts $e^{12}$ and $e^{13}$ formed in the side wall of the chamber $e^8$ and in the cap $e^6$ respectively. One end of the duct $e^{13}$ communicates with the chambered portion of the cap $e^6$ so that the passage of air from the chamber $e^8$ into the cap $e^6$ subjects the diaphragm $i$ to the same pressure on its reverse side to which it is subjected on the front side. This is true, since, as pointed out before, the central passage $e^5$ communicates, when the valve $m$ is unseated, through the duct $l$, chamber $e^8$, ducts $e^{12}$ and $e^{13}$ with the interior of the cap $e^6$. Furthermore, since it is primarily the pressure of the air within the central passage $e^5$ which opposes the action of the spring $k$, it will be evident that this opposing force is removed immediately when the diaphragm $i$ is subjected on both sides to equal air pressures. Therefore, as soon as the air enters the cap $e^6$ from the central passage $e^5$ and the air pressures on the opposite sides of the diaphragm are equalized, the spring $k$ will become effective immediately to force the valve $f$ from its seat, thus placing the primary reservoir $a$ in constant communication with the secondary reservoir $d$ in the manner hereinbefore fully pointed out.

Convenient manually operable means for unseating the valve $m$, so as to place the primary reservoir $a$ in constant communication with the secondary reservoir $d$, are indicated in Figs. 2 and 3. These means comprise a rock shaft $q$ mounted transversely on the underside of the car body and provided at its ends with convenient handles $q'$ to permit the operator to rock it. Intermediate the ends of the shaft $q$ is secured an arm $q^2$ having a slot and stud connection $q^3$ with a link $m^2$ pivotally fastened at one end to an eye $m^3$ preferably threaded removably on to the end of the stem of the valve $m$. It will be evident that by rocking the shaft $q$ the operator will bring about the unseating of the valve $m$ through the connection just pointed out and that too with the utmost convenience and without getting under the car body.

It may be desirable under some circumstances to provide mechanical devices connected to the car body and operable automatically upon the loading thereof to withdraw the stem of the valve $m$ and unseat the latter, thus placing the two air reservoirs in constant communication and giving the brakes the greatest possible effective pressure. In Fig. 1 such an arrangement is indicated wherein the relatively fixed sand planks $r$ of the truck $r'$ are connected through flexible members $r^2$ to arms $q^4$ and $q^5$ respectively secured to and extending on opposite sides of a rock shaft $q$, which may be of the same character as that hereinbefore described. The flexible connections $r^2$, it is to be noted, extend over pulleys $r^3$ mounted on the relatively vertically movable car body $r'$ and arranged with respect to the connections so that when the car is unloaded the pulleys $r^3$ will hold the connections $r^2$ taut and the link connection $m^2$ will not be moved to unseat the valve $m$. If, however, the car body is loaded so as to lower the same with respect to the sand planks $r$ through the springs $s$, the pulleys $r^3$ will be lowered correspondingly, the flexible connections $r^2$ will be slackened, the operating rod $q$ will be rocked about its axis under the action of a suitable spring $t$ operatively connected therewith, the link $m^2$ will be drawn to the left (as viewed in Fig. 1) and the valve $m$ with which the link is connected will be unseated to open the duct $l$ and place the primary reservoir $a$ in constant communication with the secondary reservoir $d$ in the manner explained hereinbefore. Reversely, when the car is unloaded, it will be lifted with respect to the sand planks $r$ by the bolster spring $s$, the pulleys $r^3$ will tighten the flexible connections $r^2$ and the shaft $q$ will be rocked against the action of the spring $t$ to release the link $m^2$ and permit the valve $m$ to be seated under the action of its spring $n$ as will be understood. It will be noted that the loading of the car at one end only will not result in the unseating of the valve $m$ since in such a case the other flexible connection $r^2$ is held taut to resist the action of the spring $t$.

Modifications in the construction and arrangement of any or all of the constituent parts of the improved system herein described, and particularly alterations in the form of the valve, may be made without departing from the spirit of the invention provided that the functions and advantages thereof are realized by the employment of the structure set out in the appended claims.
I claim as my invention:

1. In a fluid pressure brake system, the combination of a brake cylinder, a primary air reservoir in communication therewith, a secondary air reservoir, ducts connecting the reservoirs, a valve to control the admission of air into the primary reservoir from the secondary reservoir, a diaphragm operatively disposed with respect to the valve and subject on one side to the pressure of the air in the primary reservoir, and a spring in engagement with the other side of the diaphragm, the spring being operative upon the decrease of pressure in the primary reservoir to a predetermined point to open the valve.

2. In a fluid pressure brake system, the combination of a brake cylinder, a primary air reservoir in communication therewith, a secondary air reservoir, ducts connecting the reservoirs, a valve to control the admission of air into the primary reservoir from the secondary reservoir, a spring to hold the valve to its seat, a diaphragm subject on one side to the pressure of the air in the primary reservoir, a spring engaging the other side of the diaphragm, and means connecting operatively the diaphragm and the valve, said diaphragm being operative upon decrease of pressure in the primary reservoir to a predetermined point to open the valve.

3. In a fluid pressure brake system, the combination of a brake cylinder, a primary air reservoir in communication therewith, a secondary air reservoir, ducts connecting the reservoirs, a valve in said connection to control the admission of air into the primary reservoir from the secondary reservoir and operable automatically upon the reduction of air pressure in the primary reservoir to a predetermined point and means whereby the valve may be opened and retained in opened position to place the reservoirs in constant communication.

4. In a fluid pressure brake system, the combination of a brake cylinder, a primary air reservoir in communication therewith, a secondary air reservoir, ducts connecting the reservoirs, a valve in said connection to control the admission of air into the primary reservoir from the secondary reservoir and operable automatically upon the reduction of air pressure in the primary reservoir to a predetermined point, means whereby the valve may be opened and retained in opened position, and mechanically operable devices to initiate the operation of said last named means.

5. In a fluid pressure brake system, the combination of a brake cylinder, a primary air reservoir, a secondary air reservoir, ducts connecting the reservoirs, a valve to control the admission of air into the primary reservoir from the secondary reservoir, a diaphragm in operative engagement with the valve, a spring engaging the diaphragm on one side, the diaphragm being subject on the other side to the pressure of the air in the primary reservoir, and a valve-controlled passage whereby air may be admitted to the first named side of the diaphragm to equalize substantially the air pressure on its two sides, the spring then being operative to hold the first named valve in opened position.

6. In a fluid pressure brake system, the combination of a brake cylinder, a primary air reservoir in communication therewith, a secondary air reservoir, ducts connecting the reservoirs, a valve to control the admission of air into the primary reservoir from the secondary reservoir, a diaphragm operatively disposed with respect to the valve and subject on one side to the pressure of the air in the primary reservoir, a spring in engagement with the other side of the diaphragm, the spring being operative upon the decrease of pressure in the primary reservoir to a predetermined point to open the valve, and a valve-controlled passage whereby the primary reservoir air may be led to act on the spring pressed side of the diaphragm to equalize the air pressure on its sides and permit the spring to hold the first named valve from its seat and place the reservoirs in constant communication.

7. In a fluid pressure brake system, the combination of a brake cylinder, a primary air reservoir in communication therewith, a secondary air reservoir, ducts connecting the reservoirs, a valve to control the admission of air into the primary reservoir from the secondary reservoir, a diaphragm operatively disposed with respect to the valve and subject on one side to the pressure of the air in the primary reservoir, a spring in engagement with the other side of the diaphragm, the spring being operative upon the decrease of pressure in the primary reservoir to a predetermined point to open the valve, a chamber in which said spring is disposed, a passage connecting said chamber with the other side of the diaphragm, a valve to control said passage and operable to open the passage and admit primary reservoir air into said spring chamber to equalize the air pressures on the two sides of the diaphragm and permit the spring to hold the first named valve in opened position.

8. In a fluid pressure brake system, the combination of a brake cylinder, a primary air reservoir in communication therewith, a secondary air reservoir, ducts connecting the reservoirs, a valve to control the admission of air into the primary reservoir from the secondary reservoir, a diaphragm operatively disposed with respect to the valve and subject on one side to the pressure of the air in the primary reservoir, a spring in engagement with the other side of the diaphragm, the spring being operative upon the decrease of pressure in the primary reservoir to a predetermined point to open the valve, a passage to place the space on opposite sides of the diaphragm in communication, a second valve to control the passage, a piston mounted on the stem of said second valve, and means to initiate the movement of the last named valve from its seat, the pressure of the primary air reservoir acting on the piston to hold said valve from its seat.

9. In a fluid pressure brake system mounted on a car, the combination of a brake cylinder, a primary air reservoir, a secondary air reservoir, a valve chamber, a valve within the chamber to control the admission of air from the secondary reservoir into the primary reservoir, a second valve to control the effective air pressure within the valve chamber whereby the position of the first named valve is determined, a spring to hold the second named valve to its seat, a second spring to unseat said valve, and operative connections between the last named spring and the car body whereby the last named spring is operative only when the car is loaded.

10. A valve to control the passage of fluid from a source of supply to a point of discharge, comprising a movable valve plug, operable automatically upon the reduction of air pressure on the discharge side of the valve to a predetermined point, and means whereby the valve plug may be opened and retained in opened position to place the discharge side in constant communication with the source of supply.

11. A valve to control the discharge of air from a source of supply to a point of discharge, comprising a movable valve plug, a diaphragm in operative engagement with the plug, a spring engaging the diaphragm on one side, the diaphragm being subject on the other side to the pressure of the air on the discharge side, and a valve-controlled passage whereby air may be admitted to the first named side of the diaphragm to equalize substantially the air pressure on its two sides, the spring then being operative to hold the valve plug in opened position.

12. A valve to control the passage of air from a source of supply to a point of discharge, comprising a movable valve plug, a diaphragm operatively disposed with respect to the plug and subject on one side to the pressure of air on the discharge side, a spring in engagement with the other side of the diaphragm, the spring being operative upon the decrease of pressure on the discharge side to a predetermined point to open the valve plug, and a valve-controlled passage whereby the air on the discharge side may be led to act on the spring pressed side of the diaphragm to equalize the air pressure on its sides and permit the spring to hold said valve plug from its seat and place the discharge side in constant communication with the source of supply.

13. A valve to control the discharge of air from a source of supply to a point of discharge, comprising a movable valve plug, a diaphragm operatively disposed with respect to the plug and subject on one side to the pressure of the air on the discharge side, a spring in engagement with the other side of the diaphragm, the spring being operative upon the decrease of pressure on the discharge side to a predetermined point to open the valve plug, a passage to place the space on opposite sides of the diaphragm in communication, a second valve plug to control the passage, a piston mounted on the stem of said second valve plug, and means to initiate the movement of the last named valve plug from its seat, the pressure of the air on the discharge side acting on the piston to hold said last named valve plug from its seat.

14. In a fluid pressure brake system mounted on a car, the combination of a brake cylinder, a primary air reservoir, a secondary air reservoir, a valve chamber, a valve within the chamber to control the admission of air from the secondary reservoir into the primary reservoir, a second valve to control the effective air pressure within the valve chamber whereby the position of the first named valve is determined, and a spring to hold the second named valve to its seat, said spring being operable automatically upon the reduction of the air pressure within the valve chamber to a predetermined point.

This specification signed and witnessed this 26th day of July A. D. 1913.

WILLIAM H. SAUVAGE.

Signed in the presence of—
 E. M. TAYLOR,
 WORTHINGTON CAMPBELL.

Copies of this patent may be obtained for five cents each, by addressing the "Commissioner of Patents, Washington, D. C."